(12) United States Patent
Duttweiler

(10) Patent No.: US 6,813,352 B1
(45) Date of Patent: Nov. 2, 2004

(54) QUADRATURE FILTER AUGMENTATION OF ECHO CANCELER BASIS FUNCTIONS

(75) Inventor: Donald Lars Duttweiler, Rumson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/393,948

(22) Filed: Sep. 10, 1999

(51) Int. Cl.[7] .............................................. H04M 9/08
(52) U.S. Cl. .......................... 379/406.08; 379/406.01; 379/406.02; 379/406.03; 379/406.05; 379/406.06; 379/406.09; 379/406.11
(58) Field of Search ...................... 379/406.01, 406.08

(56) References Cited

U.S. PATENT DOCUMENTS

| | | | |
|---|---|---|---|
| 3,500,000 A | | 3/1970 | Kelly, Jr. et al. |
| 4,468,641 A | | 8/1984 | Duttweiler et al. |
| 4,491,701 A | | 1/1985 | Duttweiler et al. |
| 4,562,312 A | | 12/1985 | Duttweiler |
| 4,591,669 A | | 5/1986 | Duttweiler et al. |
| 4,628,157 A | * | 12/1986 | Chance et al. ......... 379/406.08 |
| 4,731,834 A | | 3/1988 | Duttweiler et al. |
| 5,089,981 A | | 2/1992 | Cabot |
| 5,187,692 A | * | 2/1993 | Haneda et al. ......... 379/406.08 |
| 5,566,167 A | | 10/1996 | Duttweiler |
| 5,631,899 A | | 5/1997 | Duttweiler |
| 5,668,865 A | | 9/1997 | Duttweiler et al. |
| 5,752,229 A | | 5/1998 | Duttweiler et al. |
| 6,182,035 B1 | * | 1/2001 | Mekuria ..................... 704/236 |
| 6,226,322 B1 | * | 5/2001 | Mukherjee ................. 375/229 |
| 6,574,336 B1 | * | 6/2003 | Kirla ..................... 379/406.01 |

FOREIGN PATENT DOCUMENTS

DE 3804332 A1 8/1989
EP 0 347 394 A1 12/1989

OTHER PUBLICATIONS

G.W. Davidson et al., "Reduced Complexity Echo Cancellation Using Orthonormal Functions," IEEE Transactions on Circuits and Systems, vol. 38, No. 1, New York, pp. 20–28, Jan. 1991.
G. Long et al., "Study of Pole–Zero Adaptive Echo Canceller," IEEE Transactions on Circuits and Systems, vol. CAS–34, No. 7, pp. 765–769, Jul. 1987.
I. Korn, "Analogue Adaptive Hybrid for Digital Transmission on Subscriber Lines," IEE Proceedings, vol. 131, Pt. F., No. 5, pp. 517–525, Aug. 1984.
S. Koike, "Convergence and Residual Echo Analysis of an Echo Canceller with a First–Order IIR Filter," NEC Corporation, pp. 343–357, 1992.
A.W. Hull et al., "A Comparison of Two IIR Filter Structures for Adaptive Digital Filtering," IEEE, ISCAS '88, pp. 527–530, 1988.
D.L. Duttweiler, "A Twelve–Channel Digital Echo Canceler," IEEE Transactions on Communications, May 1978, pp. 647–653.

* cited by examiner

Primary Examiner—Forester W. Isen
Assistant Examiner—Ramnandan Singh

(57) ABSTRACT

An echo canceler has its otherwise conventional tapped delay line basis functions augmented with at least one pair of basis functions realizing two quadrature responses of a complex pole. The frequency of this complex pole is selected as substantially equal to the frequency of the dominant pole of a highpass filter inserted into the echo path of the echo canceler, where the dominant pole is the pole closest to the unit circle. This echo canceler arrangement results in a substantial improvement in attainable echo-return-loss enhancement (ERLE).

25 Claims, 7 Drawing Sheets

US 6,813,352 B1

QUADRATURE FILTER AUGMENTATION OF ECHO CANCELER BASIS FUNCTIONS

FIELD OF THE INVENTION

The present invention relates generally to signal processing techniques, and more particularly to filtering techniques for use in echo cancellation applications.

BACKGROUND OF THE INVENTION

An echo canceler is a type of filter utilized to reduce or eliminate the presence of signal "echos" or reflections, e.g., in transmission lines of telecommunication systems. For example, echoes characterized by a partial reflection of an incoming signal are produced in transmission lines of a telecommunication system whenever an impedance discontinuity or mismatch exists, such as at the junction between a four-wire transmission path and a two-wire transmission path in a telephone network or other telecommunication network. If the so-called echo-path delay is very small, then the reflected signal is typically not noticed at the source of the original signal. However, if the echo-path delay is otherwise, then the echo becomes, qualitatively, annoying to the source, i.e., the talking party. A conventional echo canceler synthesizes an estimate of the echo signal and subtracts the estimate from an outgoing signal to effectively "cancel out" the echo signal. Such echo cancelers are described in greater detail in, e.g., D. L. Duttweiler, "A Twelve-Channel Digital Echo Canceler," IEEE Transactions on Communications, May 1978, pp. 647–653.

In telecommunication network applications, echo cancelers are often installed as stand-alone pieces of equipment with digital pulse-coded modulation (PCM) interfaces. The echo paths these echo cancelers see therefore necessarily contain the $\mu$-law or A-law quantization generally associated with the use of PCM. This quantization limits the maximum attainable echo-return-loss enhancement (ERLE) to about 35 dB. However, very large scale integration (VLSI) technology has now progressed to the point where it has become feasible to integrate an echo canceler on a codec chip. If the codec is an oversampled codec, as is typically the case, then it usually includes internal linear PCM encodings of transmit and receive signals. These digital representations generally exhibit signal-to-noise ratios (SNRs) greater than the 35 dB ERLE limit associated with PCM $\mu$-law quantization, at least for larger amplitude signals. Therefore, by moving the echo canceler inside the linear-to-companded transcoders, it appears that it would be possible to provide SNRs greater than the above-noted 35 dB limit.

Unfortunately, another problem exists just below the 35 dB limit imposed by $\mu$-law quantization. More specifically, echo paths generally contain low-frequency poles introduced by highpass filtering, equalization, balance networks, and/or terminating loops. These low-frequency poles introduce long, low-frequency tails into the echo path impulse response the canceler is to synthesize. A conventional canceler can only truncate these tails. The amplitude of these low-frequency tails is generally weak enough that the error introduced by such truncation is comparatively small and less than the above-noted 35 dB limit imposed by $\mu$-law quantization. Nonetheless, in applications in which it desirable to achieve an ERLE of more than 35 dB, and especially if the canceler is short, i.e., contains fewer than about 64 taps, truncation becomes problematic.

A need therefore exists for improved echo cancellation techniques which provide substantially improved performance relative to the above-described conventional truncation approach.

SUMMARY OF THE INVENTION

The present invention provides an improved echo canceler including an adaptive filter having as its basis functions a set of tapped delay line basis functions and one or more additional basis functions implementing quadrature responses of a complex pole. The frequency of the complex pole is substantially equal to the frequency of a dominant pole of an echo path associated with the echo canceler. The dominant pole of the echo path may be forced to a known location by introducing a highpass filter into the echo path.

In an illustrative embodiment of the invention, an echo canceler includes at least one pair of filter taps which correspond to a fixed complex pole matched to a low-frequency complex pole of a highpass filter arranged in an echo path of the echo canceler. The highpass filter may be an nth-order Butterworth, Chebyshev or elliptic highpass filter. The echo canceler basis functions thus formed include the usual flat-delay basis functions of a conventional echo canceler, but augmented by a pair of infinite-impulse-response (IIR) filters with components in quadrature. The dominant complex pole of the highpass filter is the complex pole that is closest to the unit circle. It substantially controls the tail of the impulse response of the highpass filter. The frequency of the complex pole of the pair of filter taps in the echo canceler is selected as substantially equivalent to the frequency of this dominant complex pole of the highpass filter. This echo canceler arrangement results in a substantial improvement in attainable echo-return-loss enhancement (ERLE).

The techniques of the present invention may be implemented in a straightforward manner in a digital signal processor (DSP) or other type of signal processing device. Advantageously, the invention achieves substantial improvements in terms of ERLE relative to conventional tail truncation approaches. For example, an illustrative embodiment of the invention can provide an ERLE on the order of 76 dB. These and other features and advantages of the present invention will become more apparent from the accompanying drawings and the following detailed description.

DETAILED DESCRIPTION OF THE INVENTION

The present invention will be illustrated below in conjunction with exemplary echo cancellation techniques. It should be understood, however, that the invention is not limited to use with any particular type of echo canceler configuration.

The present invention provides an echo canceler which exhibits substantially improved echo-return-loss enhancement (ERLE) performance relative to conventional echo cancelers. The invention in an illustrative embodiment adds a highpass filter in the echo path, and then augments otherwise conventional echo canceler basis functions, e.g., the signals along a multi-tap tapped delay line, with two new basis functions. In accordance with the invention, the two new basis functions are quadrature responses of a low-frequency complex pole. The frequency of the low-frequency complex pole is the same as the frequency of the complex pole in the added highpass filter that is closest to the unit circle.

Figure 1:
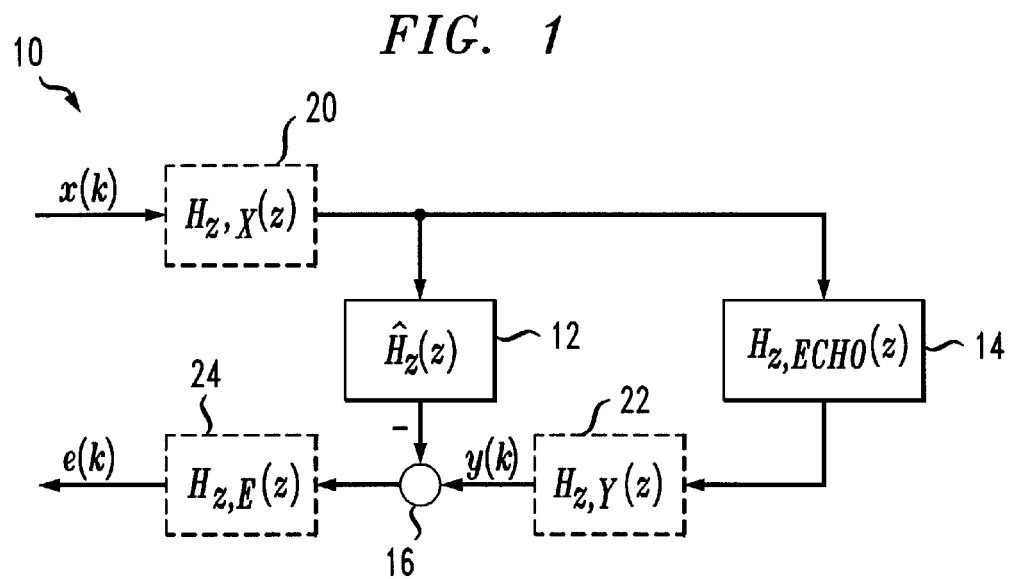
FIG. 1 shows an exemplary echo canceler system configuration in which the invention may be implemented and its performance assessed.

The above-noted illustrative embodiment of the invention will be described with reference to simulations based on an exemplary echo canceler system configuration as shown in FIG. 1.

FIG. 1 shows a signal transmission system 10 including an adaptive filter 12 denoted $\hat{H}_z(z)$ and an echo path 14 having the transfer function $H_{z,ECHO}(z)$. The signal x(k) is an input signal, and the signal y(k) is an echo signal generated by the echo path 14. The adaptive filter 12 synthesizes an estimate of the echo signal, and the estimate is subtracted from the actual echo signal y(k) in subtractor 16 to effectively cancel out the echo signal. The resulting signal e(k) is an error signal which is indicative of the quality of the echo cancellation process, i.e., the smaller the error signal e(k), the better the echo cancellation. Also shown, in dotted boxes, are filters 20, 22 and 24, denoted $H_{z,X}(z)$, $H_{z,Y}(z)$, and $H_{z,E}(z)$, respectively, that may or may not be present in a given one of the simulations to be described below, depending on the particular configuration of the system 10. The filters 20, 22 and 24 are also referred to herein as X, Y and E filters, respectively.

It should be noted that the illustrative embodiment of the invention comprises the adaptive filter 12, denoted $\hat{H}_z(z)$, subtractor 16, and filter 22, denoted $H_{z,Y}(z)$. The echo path 14, denoted $H_{z,ECHO}(z)$, is a simulated echo path and thus not part of the illustrative embodiment of the invention. The filters 20 and 24, denoted $H_{z,X}(z)$ and $H_{z,E}(z)$, respectively, are also not part of the illustrative embodiment of the invention. The former is introduced as a means to create a meaningful excitation signal for the simulations and the latter is introduced as a means to derive a meaningful signal to monitor during simulation.

If in a system such as that described above an impedance $Z_S(s)$ is used to balance a signal transmission loop with impedance $Z_L(s)$, an echo path $$H_{s,ECHO}(s) = \frac{Z_S(s) - Z_L(s)}{S_S(s) + Z_L(s)} \quad (1)$$

is created. For the following simulations used to illustrate the invention, the simplifying assumption will be made that Equation (1) completely defines the echo path. In other words, any highpass filtering or equalization that may also be present in the echo path is neglected. However, since this highpass filtering or equalization can also introduce low-frequency poles, it should be noted that the techniques of the invention used to overcome the low-frequency pole introduced by Equation (1) also simultaneously work to overcome any low-frequency poles introduced by these other mechanisms.

Additionally, it will be assumed for the simulations described herein that the balancing impedance is a 600 ohm resistor $R_S$ in series with a 2.16 microfarad capacitor $C_S$, and that the loop impedance is a 900 ohm resistor $R_L$. It should be understood that this an arbitrary choice for purposes of illustration only. The techniques of the invention can of course be utilized with other impedance values.

Advantageously, the techniques of the invention can overcome the effects of low-frequency poles in the echo path without specific knowledge of the number and/or locations of these low-frequency poles.

With the above choice of impedances, it is straightforward to calculate that $$H_{s,ECHO}(s) = \frac{1 + sC_S(R_S - R_L)}{1 + sC_S(R_S + R_L)}. \quad (2)$$

The low-frequency pole is at $$f_p = \frac{1}{2\pi(R_S + R_L)C_S} = 49.1 \text{ Hz}. \quad (3)$$

A bilinear transformation gives as the discrete-time approximation of $H_{s,ECHO}(s)$ $$H_{z,ECHO}(z) = H_{s,ECHO}\left(\frac{2}{T}\frac{1-z^{-1}}{1+z^{-1}}\right) \quad (4)$$

$$= \frac{(1+\beta_N) + (1-\beta_N)z^{-1}}{(1+\beta_D) + (1-\beta_D)z^{-1}}$$

where $$\beta_N = \frac{2C_S}{T}(R_S - R_L) = -10.36 \quad (5)$$

and $$\beta_D = \frac{2C_S}{T}(R_S + R_L) = 51.84 \quad (6)$$

with T denoting the sampling period, assumed to be 125 microseconds (8 kHz sampling rate).

Figure 2:
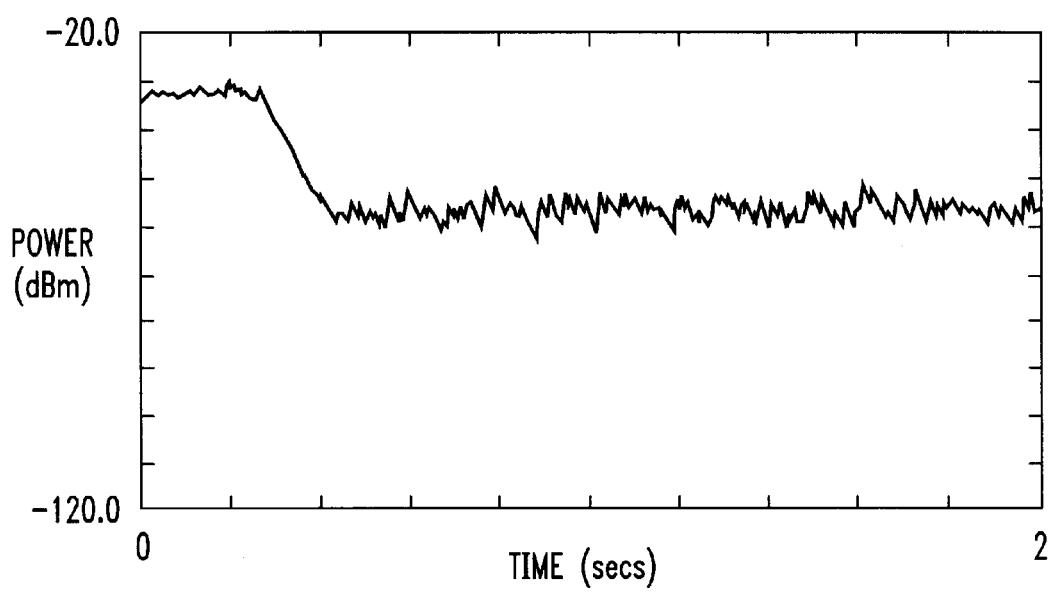
FIGS. 2 through 6 and 9 through 13 show simulation results associated with illustrative embodiments of the invention.

FIG. 2 is a plot of output power as a function of time in seconds. Power is referenced to the so-called 0 transmission level point and is given in decibels relative to a milliwatt (dbm0). The figure shows convergence of the echo cancellation process of FIG. 1 in a configuration in which none of the filters 20, 22 and 24 in the dotted boxes are present. In this simulation, the input x(k) was −20 dBm0 white Gaussian noise. Adaptive filter 12 was implemented as a conventional 64-tap echo canceler adaptive filter adapted using the well-known normalized least-mean squares (NLMS) algorithm. The normalized loop gain λ of the FIG. 1 system in this configuration, with 2.0 being the stability limit, was set to 0.2. Adaptation in the adaptive filter 12 was inhibited for the first 2000 samples, i.e., for ¼ second.

The vertical scale in FIG. 2 runs from −120 dBm0 to −20 dBm0. In order to facilitate visual comparison, this same vertical scale will be used in all convergence curve figures to be presented herein.

The plotted power was obtained by filtering the square of the error signal e(k) in a first-order lowpass filter with a time constant of 100 samples. The theoretical convergence rate of an NLMS echo canceler with a length N of 64 and with a loop gain λ of 0.2 is $$R = 8000\frac{10}{\ln 10}\frac{1}{N}\lambda(2-\lambda) = 195.4 \text{ dB per second}. \quad (7)$$

A lowpass filter with a time constant τ of 100 samples decays at $$-8000 \cdot \log_{10} e^{-1/\tau} = 347.4 \text{ dB per second.} \qquad (8)$$

Although using a longer time constant than 100 samples in the above-noted lowpass filter would generally smooth out the ripple in the convergence curves, it would have the undesirable effect of making it difficult to see rapid convergence transients.

Since $H_{s,ECHO}(j2\pi f)$ only falls off significantly for very low frequencies in the 0 to 4000 Hz interval, the initial echo is expected to be about $$10.0 \cdot \log 10 |H_{s,ECHO}(j2\pi\infty)|^2 = 20.0 \cdot \log 10 \frac{300}{1500} = -14.0 \qquad (9)$$

dB down from the −20 dBm0 input. The plotted power in FIG. 2 for the initial ¼ second is in agreement with this expectation.

The ERLE in this simulation is only about 23 dB. The reason for this poor performance is that the above-described 64-tap echo canceler is short relative to the time constant of the 49.1 Hertz pole in the echo path.

Figure 3:
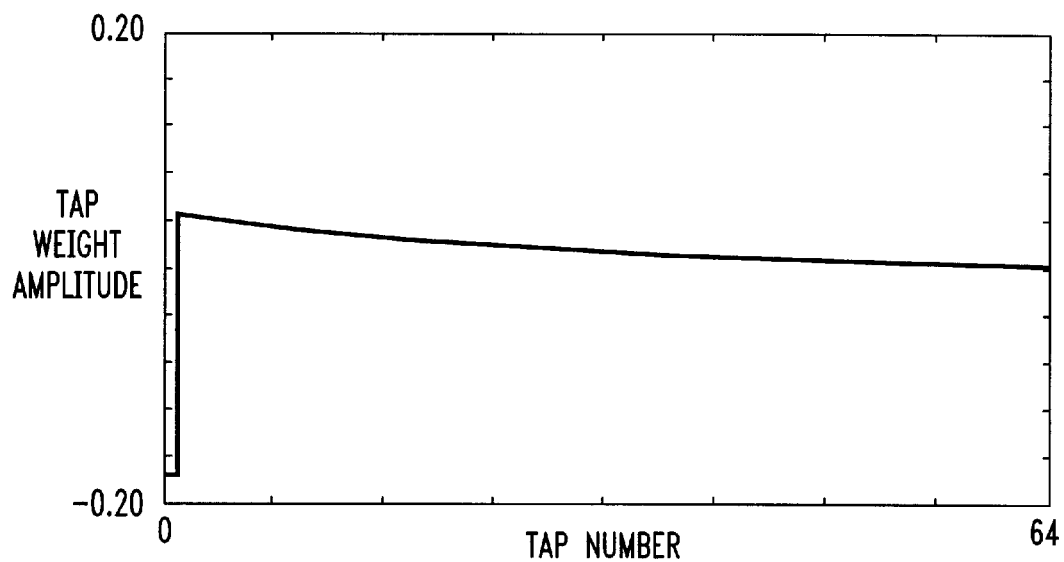

FIG. 3 shows the estimated impulse response after the end of the two second adaptation period of FIG. 2, in terms of tap weight amplitude as a function of tap number. The truncation of the exponential is readily apparent. In the figure, the exponential starts at the second tap and then decays towards zero amplitude. The initial tap is a large negative value and not part of this exponential. At the final tap, the curve has decayed to a value that is visually close to zero, but still not exactly equal to zero. More particularly, it can be seen that the tick mark is at zero and the tap weight is slightly above it. The fact that the curve on a linear scale is not visually exactly at zero, i.e., the fact that space can be seen between the tick mark and the curve, is indicative of substantial truncation.

Figure 4:
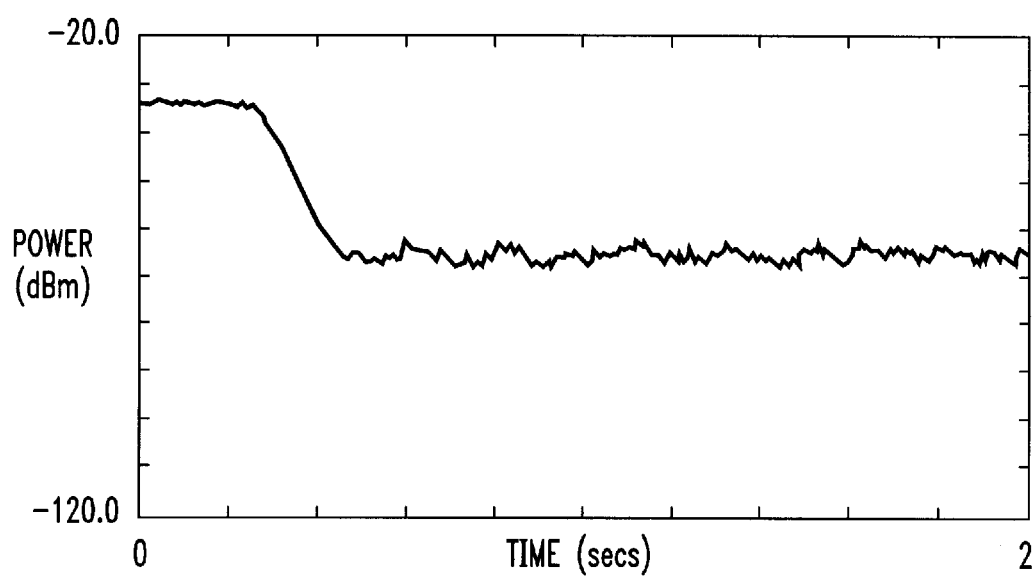

A problem with the configuration of the echo canceler system 10 without the E filter 24 present is that by simply squaring the error e(k) and then filtering this square, in the manner described previously, the error at all frequencies is being weighted equally. However, in many applications, low-frequency error is of little or no concern. Therefore, in order to eliminate low-frequency error from the error calculation and obtain a more meaningful performance assessment, the E filter 24 is inserted into the configuration of FIG. 1. FIG. 4 shows the convergence curve which results when the E filter 24 is a fourth-order Butterworth highpass filter with a 250 Hertz cutoff. The ERLE in this case is now increased to about 31 dB.

The E filter 24 is downstream from the adaptive filter 12 so it in no way changes the adaptation process, i.e., the adaptive filter 12 still adapts to the same estimated impulse response. Since the error signal used in adaptation still contains low-frequency components, the adaptation algorithm degrades performance for inband frequencies in an attempt to attain good performance at low frequencies. One can in effect direct the adaptation algorithm not to take these low-frequency components into account by adding highpass filtering in the echo path ahead of the subtraction node 16, i.e., at the location of the Y filter 22 in FIG. 1.

Figure 5:
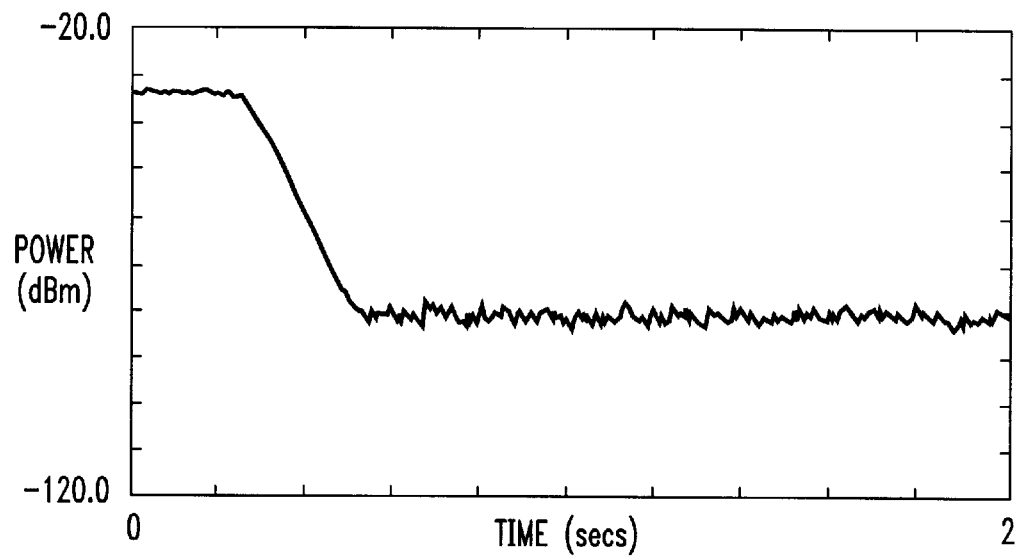
Figure 6:
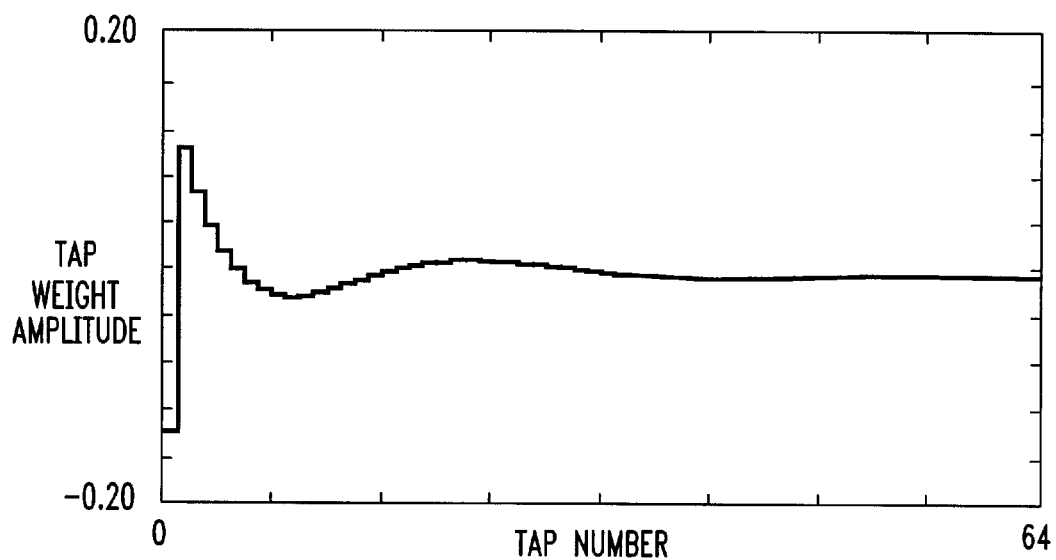

FIG. 5 shows the resulting convergence curve. This particular convergence curve was obtained with a Y filter identical to the previously-described E filter, and with that E filter left in. Since the Y filter now removes low frequency energy, essentially identical convergence curves are obtained without the post-filtering of the E filter, so it could just as well have been removed. The ERLE is now about 47 dB. The estimated echo-path impulse response, in terms of tap weight amplitude as a function of tap number, is shown in FIG. 6.

It is possible to improve even further on this 47 dB ERLE result, in the following manner. The heavy filtering effect of the 250-Hertz fourth-order Butterworth highpass Y filter 22 makes the excitation of the eigenmode associated with the 49.1 Hertz pole of the echo path extremely weak, and essentially removes this pole from consideration. The residual uncanceled echo is now primarily associated with the poles of the Y filter 22.

Figure 7:
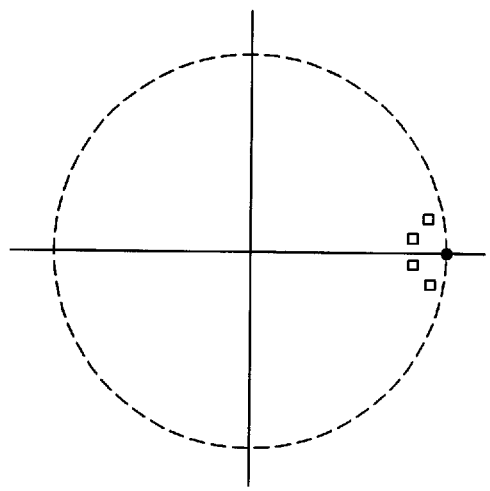
FIG. 7 shows the poles of a fourth-order highpass filter used in an illustrative embodiment of the invention.

FIG. 7 shows the locations in the z plane of the poles of the above-noted 250-Hertz fourth-order Butterworth highpass filter. The complex-pole pair closest to the unit circle is at a radius of 0.9279 and an angle of ±2π 0.0289. The other complex pole pair is at a radius of 0.8334 and an angle of ±2π 0.0121. The complex pole pair at a radius of 0.9279 dominates the tail of the impulse response of this filter. Other types of highpass filters, e.g., Chebyshev filters and elliptic filters, and filters other than fourth-order filters, will also generally have a dominant complex-pole pair in this sense. Hence, the terminology "dominant pole" as used herein is intended to refer more generally to the complex pole pair that is closest to the unit circle.

Figure 8:
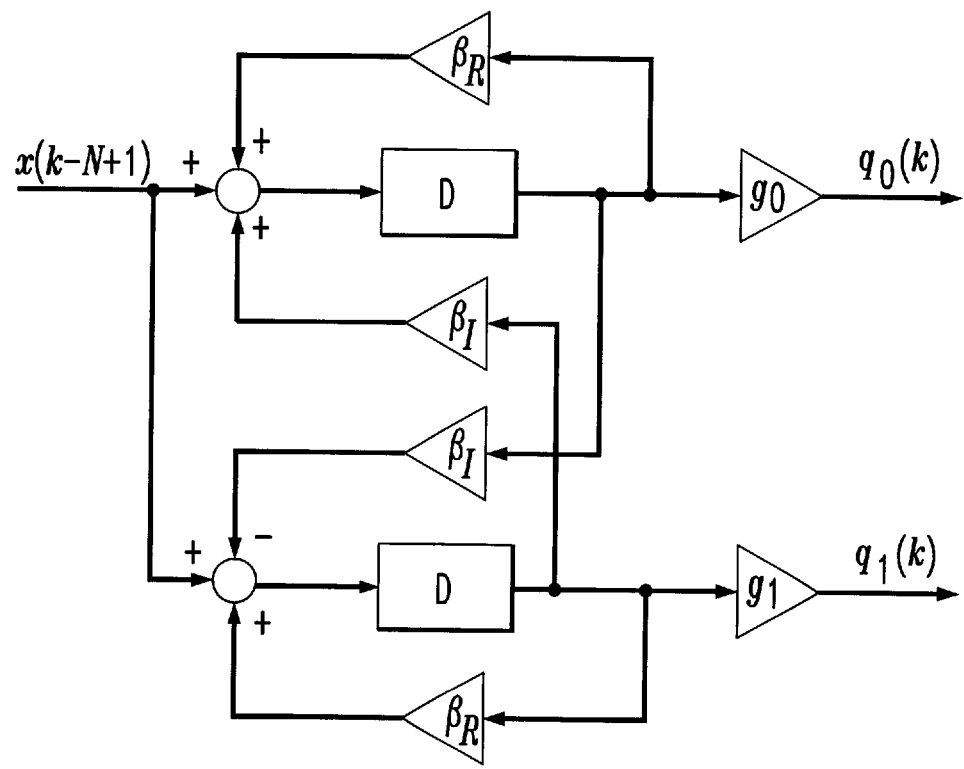
FIG. 8 shows the quadrature filter augmentation of adaptive filter basis functions in an echo canceler in accordance with an illustrative embodiment of the invention.

Let $r_p$ and $2\pi\theta_p$ be the radius and angle of the dominant complex-pole pair in the highpass Y filter. To compensate for the slow decay of this eigenmode, the conventional basis functions of the echo canceler are augmented by the two quadrature responses $q_0(k)$ and $q_1(k)$ shown in FIG. 8. These quadrature responses correspond to responses of a pair of infinite-impulse-response (IIR) filters with components in quadrature. The element D in FIG. 8 represents a sample delay unit, i.e., 125 microseconds at the assumed 8 kHz sampling rate. The gains $\beta_R$ and $\beta_I$ in FIG. 8 are the real and imaginary components of $1/z_p$, where $z_p$ is the complex number with radius $r_p$ and angle $2\pi\theta_p$. The normalizations $$g_0 = \frac{1}{\sqrt{\frac{1}{1-r_p^2} + \delta}} \qquad (10)$$

and $$g_1 = \frac{1}{\sqrt{\frac{1}{1-r_p^2} - \delta}} \qquad (11)$$

where $$\delta = \frac{r_p^2 \sin(2\pi\theta_p)}{1 - 2r_p^2\cos(2\pi\theta_p) + r_p^4} \qquad (12)$$

make the power of the two new basis functions $q_0(k)$ and $q_1(k)$ equal to the power of the finite impulse response (FIR) basis functions $x(k-n)$ for $0 \leq n < N$ when $x(k)$ is white. Notice that the input to this circuit is $x(k-N+1)$ and not $x(k)$. This is an important point. Absent this condition, there is generally a strong correlation between the quadrature basis functions $q_0(k)$ and $q_1(k)$ and the FIR basis functions $x(k-n)$ for $0 \leq n < N$, resulting in a so-called "bad-eigenvalue" problem and therefore extremely slow convergence.

Figure 9:
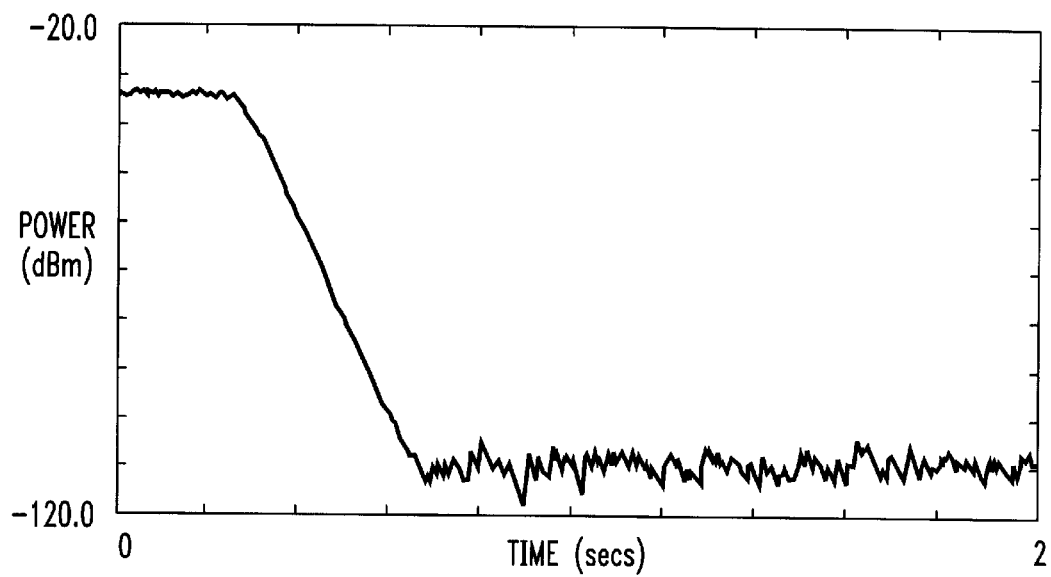

FIG. 9 shows the convergence which results from using the highpass Y filter as described above, but altering the adaptive filter 12 so that it contains 62 conventional FIR taps and the two quadrature taps of FIG. 8. The ERLE in this case is about 76 dB. Additional details regarding conventional adaptive filter taps and corresponding flat-delay basis functions may be found in, e.g., the above-cited D. L. Duttweiler reference, and in U.S. Pat. No. 3,500,000.

Figure 10:
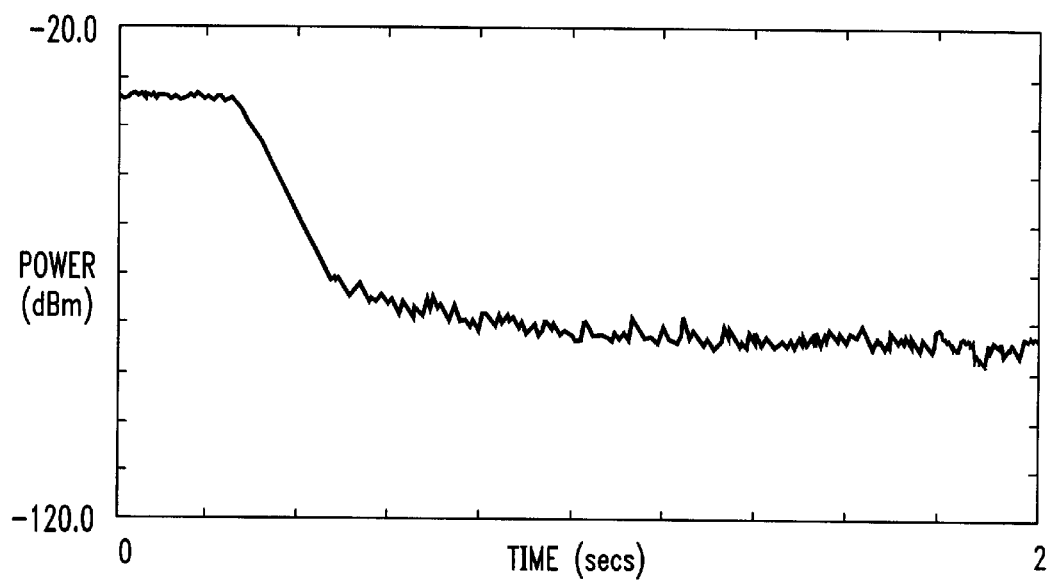
Figure 11:
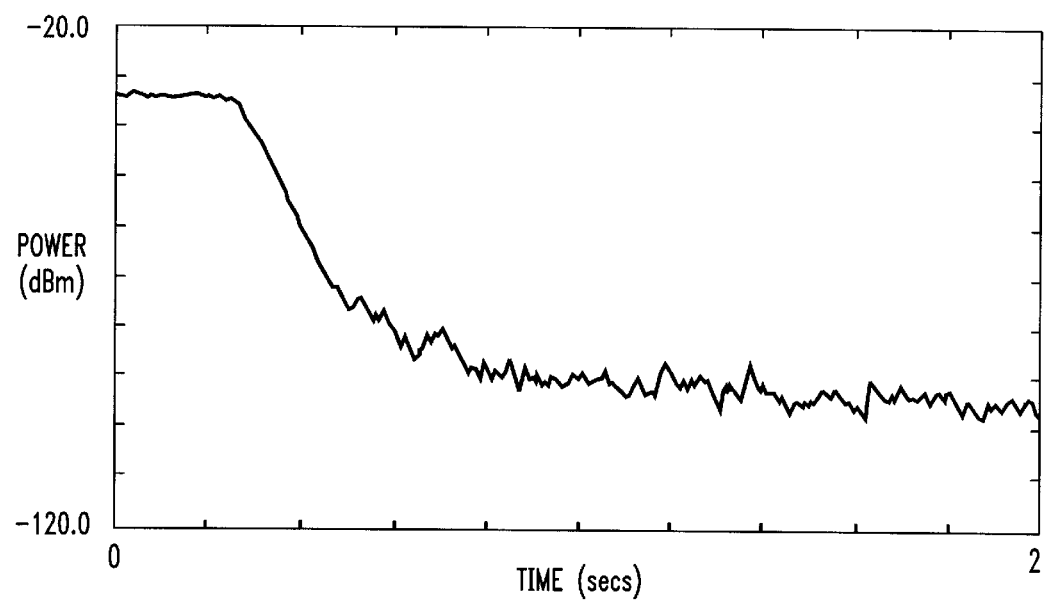

In generating the results of FIGS. 6 and 9, the echo path signal y(k) is heavily filtered, but white Gaussian noise is still used as the excitation input signal x(k). If the adaptive filter 12 is to be used on a local end of a communication link, it is likely that the far end of the link may also have similar heavy filtering. This will result in an input signal x(k) that is no longer white, but is instead a highpass signal. FIGS. 10 and 11 correspond to FIGS. 6 and 9, but with the activation of a highpass X filter 20 identical to the previously-described highpass Y filter.

Figure 12:
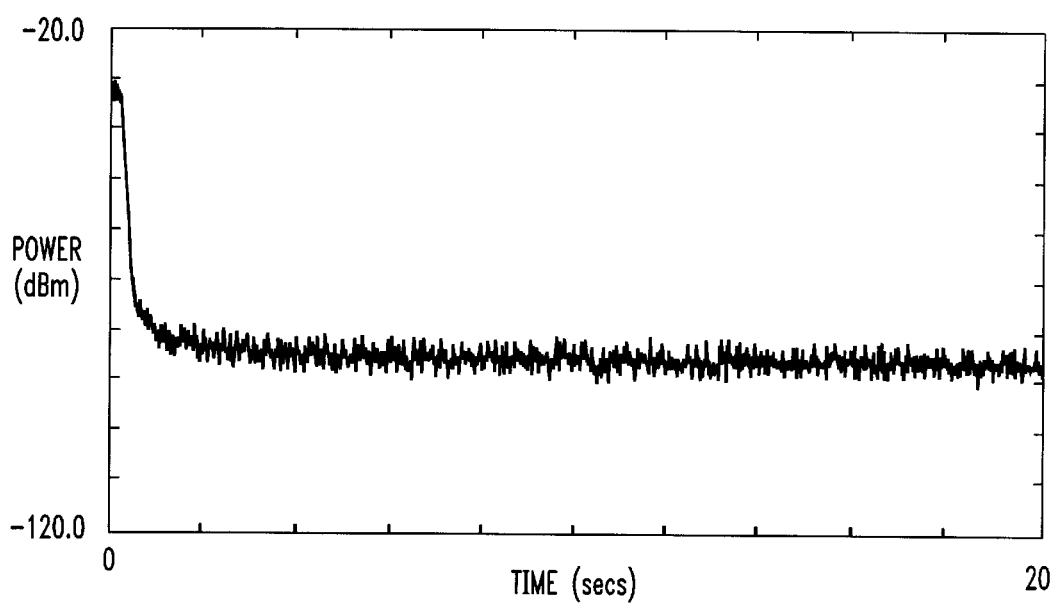
Figure 13:
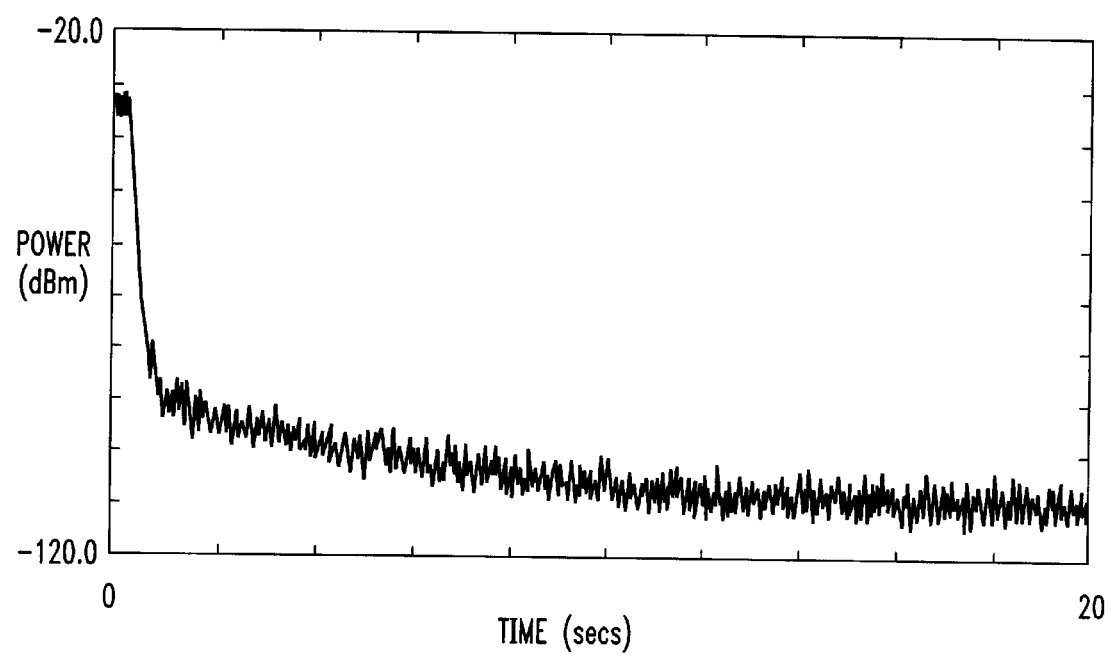

The time scale in FIGS. 10 and 11 is 2 seconds, as in all previous convergence curves presented herein. It is clear from these last two figures, however, that convergence is now multi-mode. A substantial ERLE is reached at a rapid rate, but the final 20 dB or so of enhancement are achieved at a much slower rate. FIGS. 12 and 13 correspond generally to FIGS. 10 and 11, respectively, but with a 20 second time scale in order to show more clearly the slower convergence for these final few dB of ERLE. It is believed that this slower convergence for these final few dB of enhancement will not be a significant impairment in practical applications.

The filtering techniques of the present invention may be implemented in a straightforward manner in one or more digital signal processors (DSPs) or other types of signal processing devices. Suitable techniques for implementing echo canceler filter taps in DSPs and other devices are well-known in the art and are therefore not described in detail herein.

It should be noted that in many echo canceler applications, there is a requirement to remove direct current (DC) and/or low-frequency power-line noise from a signal being returned to a communication network. Highpass filters are often used to accomplish this. Thus, the highpass filter described above as being added to the echo path of an echo canceler may actually already be present for other reasons, in which case the present invention allows such a filter to serve multiple distinct purposes.

The above-described embodiments of the invention are intended to be illustrative only. For example, as previously noted, alternative embodiments may utilize filter configurations and element values other than those described in conjunction with the illustrative embodiments. These and numerous other alternative embodiments may be devised by those skilled in the art without departing from the scope of the following claims.

What is claimed is:

1. An apparatus comprising:
an echo canceler including an adaptive filter having as its basis functions a set of tapped delay line basis functions and at least two additional basis functions each implementing a quadrature response of a corresponding complex pole in a complex-pole pair;
wherein the two additional basis functions implementing the quadrature responses are provided by respective first and second filters with components of the first filter being in quadrature with components of the second filter.

2. The apparatus of claim 1 wherein the frequency of a given complex pole in the complex-pole pair is substantially equal to the frequency of a dominant pole of an echo path associated with the echo canceler.

3. The apparatus of claim 2 wherein the dominant pole of the echo path is forced to a known location by introducing a highpass filter into the echo path.

4. The apparatus of claim 3 wherein the dominant pole is a pole of the highpass filter that is closest to a unit circle.

5. The apparatus of claim 3 wherein the dominant pole is a pole of the highpass filter controlling a tail of an impulse response of the highpass filter.

6. The apparatus of claim 3 wherein the highpass filter is an nth-order highpass filter, where n is greater than or equal to two.

7. The apparatus of claim 3 wherein the highpass filter comprises at least one of a Butterworth filter, a Chebyshev filter and an elliptic filter.

8. The apparatus of claim 3 wherein the adaptive filter is coupled between a point on an input signal line and a first input of a subtractor, and the echo path is in parallel with the adaptive filter between the point on the input signal line and a second input of the subtractor, and further wherein the highpass filter is arranged within the echo path between the point on the input signal line and the second input of the subtractor.

9. A method of processing a signal, the method comprising the steps of:
processing the signal in an echo canceler including an adaptive filter having as its basis functions a set of tapped delay line basis functions and at least two additional basis functions each implementing a quadrature response of a corresponding complex pole in a complex-pole pair;
wherein the two additional basis functions implementing the quadrature responses are provided by respective first and second filters with components of the first filter being in quadrature with components of the second filter.

10. The method of claim 9 wherein the frequency of a given complex pole in the complex-pole pair is substantially equal to the frequency of a dominant pole of an echo path associated with the echo canceler.

11. The method of claim 10 wherein the dominant pole of the echo path is forced to a known location by introducing a highpass filter into the echo path.

12. The method of claim 11 wherein the dominant pole is a pole of the highpass filter that is closest to a unit circle.

13. The method of claim 11 wherein the dominant pole is a pole of the highpass filter controlling a tail of an impulse response of the highpass filter.

14. The method of claim 11 wherein the highpass filter is an nth-order highpass filter, where n is greater than or equal to two.

15. The method of claim 11 wherein the highpass filter comprises at least one of a Butterworth filter, a Chebyshev filter and an elliptic filter.

16. The method of claim 11 wherein the adaptive filter is coupled between a point on an input signal line and a first input of a subtractor, and the echo path is in parallel with the adaptive filter between the point on the input signal line and a second input of the subtractor, and further wherein the highpass filter is arranged within the echo path between the point on the input signal line and the second input of the subtractor.

17. An echo canceler comprising:
an adaptive filter having as its basis functions a set of tapped delay line basis functions and at least two additional basis functions each implementing a quadrature response of a corresponding complex pole in a complex-pole pair; and a highpass filter arranged in an echo path associated with the echo canceler, wherein a given complex pole of the complex-pole pair is matched to a complex pole of the highpass filter.

18. The apparatus of claim 17 wherein the adaptive filter is coupled between a point on an input signal line and a first input of a subtractor, and the echo path is in parallel with the adaptive filter between the point on the input signal line and a second input of the subtractor, and further wherein the highpass filter is arranged within the echo path between the point on the input signal line and the second input of the subtractor.

19. An apparatus comprising:
echo canceling means including an adaptive filter having as its basis functions a set of tapped delay line basis functions and at least two additional basis functions each implementing a quadrature response of a corresponding complex pole in a complex-pole pair:
wherein the two additional basis functions implementing the quadrature responses are provided by respective first and second filters with components of the first filter being in quadrature with components of the second filter.

20. An echo canceler comprising:
an adaptive filter having as its basis functions a set of tapped delay line basis functions and at least two additional basis functions each implementing a quadrature response of a corresponding complex pole in a complex-pole pair; and
a highpass filter having a dominant pole matched to a given complex pole of the complex-pole pair.

21. The apparatus of claim 20 wherein the dominant pole is a pole of the highpass filter that is closest to a unit circle.

22. The apparatus of claim 20 wherein the dominant pole is a pole of the highpass filter controlling a tail of an impulse response of the highpass filter.

23. The apparatus of claim 20 wherein the highpass filter is an nth-order highpass filter, where n is greater than or equal to two.

24. The apparatus of claim 20 wherein the highpass filter comprises at least one of a Butterworth filter, a Chebyshev filter and an elliptic filter.

25. The apparatus of claim 20 wherein the adaptive filter is coupled between a point on an input signal line and a first input of a subtractor, and the echo path is in parallel with the adaptive filter between the point on the input signal line and a second input of the subtractor, and further wherein the highpass filter is arranged within the echo path between the point on the input signal line and the second input of the subtractor.

* * * * *